United States Patent [19]

Little

[11] Patent Number: 4,893,198
[45] Date of Patent: Jan. 9, 1990

[54] METHOD AND APPARATUS FOR PERFORMING HIGH SPEED VIDEO ANIMATION

[75] Inventor: Graeme M. Little, Sunnyvale, Calif.

[73] Assignee: Ampex Corporation, Redwood City, Calif.

[21] Appl. No.: 727,455

[22] Filed: Apr. 26, 1985

[51] Int. Cl.⁴ .............................................. G11B 27/02
[52] U.S. Cl. .................................. 360/14.1; 360/35.1; 358/311; 340/725; 352/87
[58] Field of Search ................ 356/311, 903; 360/14.1, 360/13, 35.1; 352/50, 87; 340/725

[56] References Cited

U.S. PATENT DOCUMENTS

| | | | |
|---|---|---|---|
| 3,747,087 | 7/1973 | Harrison, III et al. | 352/87 X |
| 4,001,882 | 6/1977 | Fion et al. | 360/14.1 |
| 4,142,209 | 2/1979 | Hedlund et al. | 358/342 |
| 4,253,502 | 7/1985 | Menezes et al. | 360/14.1 X |
| 4,258,385 | 3/1981 | Greenberg et al. | 358/311 X |
| 4,272,790 | 6/1981 | Bates | 360/14.1 |
| 4,353,090 | 10/1982 | Broadbent | 358/342 |
| 4,357,624 | 11/1982 | Greenberg | 358/311 X |
| 4,428,001 | 1/1984 | Yamamura et al. | 360/14.1 X |

OTHER PUBLICATIONS

"An Automatic Editing System, Using a Minicomputer, Scanning of the Color Negative and Broadcasting From a Videotape Transfer"; Miura et al; SMPTE, vol. 84, No. 10, pp. 781-789-Oct. 1975.

Primary Examiner—Aristotelis M. Psitos
Attorney, Agent, or Firm—George B. Almeida; Richard P. Lange

[57] ABSTRACT

An animation recording process is particularly adapted to videotape recorders of the type having a control panel display, multifunction soft keys, and are microprocessor controlled. Rapid recording of large pluralities of still images is effected using the animation "cel" recording concept wherein a selected cel is recorded as a selectable repetition of a single still image is recorded without interruption between frames or fields of the cel, i.e., without recueing the transport. Using the cel concept further allows the determination of not only the subsequent cel edit entry point, but also of the subsequent cel edit exit point, whereby pre-programming the points allows automating the recording of an animated program with a minimum of operator attention.

18 Claims, 6 Drawing Sheets

FIG_4

FIG_6 MAIN ANIMATE ROUTINE

FIG_7
FORWARD SINGLE
CEL INDEXING ROUTINE

FIG_8
REVERSE SINGLE
CEL INDEXING ROUTINE

METHOD AND APPARATUS FOR PERFORMING HIGH SPEED VIDEO ANIMATION

BACKGROUND AND SUMMARY OF THE INVENTION

The invention relates to video animation techniques, and particularly to high speed production of animated programs formed in turn of a selected succession of still images, utilizing high speed electronic edits on a videotape recorder.

The continually on-going development of more sophisticated, high speed videotape recorders has resulted in a corresponding increase in the number and types of applications in which the recorders are particularly suited. One such field in which videotape recorders are finding increasingly more use, and which field until recently has been relegated to the film industry, is in the area of recording and playing back still pictures, and more particularly in the recording of preselected successions of still video images. Such a technique for recording and reproducing a succession of still images is commonly known in the art as an animation process, with the recorded material being known as an animated program. Currently in the video recording field there is increasing demand for animation and, in particular, for improved techniques for generating animated programs in the areas of, for example, advertising and cartoons. However, these well known fields of animation are only a small area of a presently increasing sphere of interest, wherein animation techniques may be advantageously applied.

To illustrate, the military forces and industry in general have found a need for animation in providing instructional material for educational purposes, employing the use of the television medium. In such fields, instructional material used for learning processes readily may be recorded by the animation technique, utilizing a video camera and a videotape recorder to transfer a page of the instructional material onto one frame or field in the video tape medium, which then may be shown in stop motion during instruction. Thus large numbers of pages from an instruction or maintenance manual may be reconstructed into an animated program on video tape, along with any introduction and/or explanatory remarks and art work such as title blocks, required in the course of instructing a class via the television medium.

Still another area of increasing need for animation is the field of mastering of video discs. Although not involved in animation per se, mastering of video discs currently is a very laborious process involving either the use of multiframe stores or the transfer of images from film. Animation techniques and videotape equipment would greatly speed the mastering process by providing an animated video master on video tape onto which audio may be dubbed to produce a finished video tape which is used to make laser video discs.

At present, the most obvious need for animation is in the field of entertainment wherein several well known companies produce cartoons, as well as animated full length features for showing on television. In addition, animation techniques are widely employed by video promotional companies to provide station identification material, animated programs for commercial advertising and/or other animated promotional features and material.

In the production of animated programs, the entire plurality of still pictures which together form the program, generally are prepared prior to performing the recording process, regardless of the recording medium or technique used for recording. Until very recently, material for cartoons and promotional features have been prepared by a process generally known as hand-drawn art. In generating hand-drawn art, an animator draws an outline of the still image or picture of every image in the entire program. The drawings then are passed to another animator (termed an "in-betweener") who draws the picture outlines of the in-between images. The complete succession of outline drawings then are passed to people who color in all the outlined images. The complete animation program material is then ready to be recorded on film, video tape or other medium capable of providing playback of the succession of recorded images as a continuous animated program. Until recently, such animated programs have been mastered onto film which then is developed and shown via, for example, a film projector. It follows that animation techniques employing hand-drawn art coupled with film recording schemes require prohibitive amounts of labor, have become extremely expensive, and lack flexibility.

However, there has been substantial development in the computer graphics field, which provides artists a more convenient means for generating the still images required for assembling animated programs. Furthermore, computer graphics systems such as the Ampex Video Art (AVA-3) graphics system manufactured by the Ampex Corporation, Redwood City, Calif., supply the images in the form of video signals which accordingly can be recorded by a videotape recorder without further processing. Such graphics systems facilitate the rapid generation of still pictures. However, the combination of such a computer graphics system with present videotape recorders requires some form of control interface to allow the efficient transfer of the animation material to the videotape recorder.

In the field of animation, a term and corresponding operating parameter commonly used is "cel", which is an art unit formed of the same still image or picture recorded a selected number of times. Thus, given the hand-drawn cartoon art of previous mention, if a "cell size" of four pictures is selected, each of the pictures drawn by the animators is exposed on film four times. Thus only one-fourth of the art material is required to produce the same length animated program with, however, an attendant loss in quality of animation. Thus, increasing the duration or size of the cell, decreases the cost of generating and recording the animation material, whether recorded on film or video tape mediums, but also decreases the quality of the program. In various fields such as cartooning, the compromise is acceptable.

In this age of sophisticated high speed videotape recording techniques and apparatus, it is obvious that the use of film techniques and apparatus for generating animated programs is relatively inefficient and becoming obsolete. Furthermore, at present there are no control interfaces available for efficiently coupling a computer graphics device to a videotape recorder to record animated programs. It follows that it would be highly desirable to provide an efficient high speed technique and apparatus for generating animated programs, or for recording large pluralities of discontinuous pictures, in a video tape medium, either in real or non-real time.

Current techniques utilizing videotape recorders and their associated editing techniques, generate animated programs by recording each still image only once as a single field or frame of video. Since the recorders are capable of performing only conventional editing processes, they are incapable of using the "cel" recording technique of previous mention commonly employed to cut costs, improve the speed of program production, etc. In such conventional techniques, hand-drawn art is viewed by a video camera and recorded on video tape, or computer generated images are recorded directly on the video tape. Such systems include a "black box" control interface which provides standard edit control signals operable by the animator, wherein each video signal corresponding to a single piece of art, is recorded singly. The animator selects the use of a field or frame for recording each image, enters the condition into the recorder's edit memory, and instructs the machine to preroll to its normal cue point. The transport is stopped, and then is accelerated forward to normal record speed while the off-tape sync information is synchronized to the incoming video signal. The animator then performs the edit by recording the video image at the edit entry point a single time, whereupon he exits, and completes the postroll, rewind and review of the recorded image if desired. In situations where only short program segments are generated, such a technique is more efficient than the use of film and film techniques. However, in the generation of animated programs where each production may require thousands or many tens of thousands of edits for a one hour production, the use of such a standard editing process to record each and every still image, is extremely time consuming.

In a further sophistication of the technique employing the black box control interface, one or more electronic storage devices capable of storing still video images also are utilized, wherein the images subsequently are retrieved and supplied to a videotape recorder in real time. Such scheme also uses conventional edit techniques, cannot employ the cell concept of recording, and thus has the same disadvantages, while further requiring the use of one or more large and expensive video image storage devices.

There presently is available a videotape recorder specifically designed and manufactured for generating animated programs, with specific animation controls being built into the recorder. Such a specialized recorder, however, records in still frame, i.e., records a still video image with the tape stationary. Such apparatus fails to produce a standard type-C format if the recording is done with a non-movable record head such as existing in standard videotape recorders. To provide a type-C format, this videotape recorder employs a special moveable record head, and requires the application of special head tracking voltages, in order to selectively move the head to record a type-C format while the tape is stationary. This highly specialized apparatus requires a control track to provide cueing and thus requires a prerecorded tape to allow recording in the insert edit mode. Thus assembly editing generally is not available. In addition, in the moveable record head configuration, the frame of video is recorded on the video tape by first deriving a head tracking signal based on the playback of a previously recorded signal track on the tape while the tape is stationary. The head tracking signal is stored in storage means, whereupon it is supplied to the recording head during the single recording of a subsequent video image to cause the record head to follow the prior track while recording the next image a single time on the stationary tape. Such a special tracking record head configuration is not available in present videotape recorders, and is an unnecessarily complex addition to the recorder. In addition, the recorder cannot use the cell concept of recording a still image a selectable number of times, but must be recued after recording a still image a single time.

Accordingly, as previously discussed, it would be highly desirable to provide an animation technique employing video tape recording techniques wherein multitudes of single frame edits may be made with a minimum of operator intervention, wherein the recorder has the ability to automatically sequence the edit points to allow for more rapid and efficient recording of the animated program.

The present invention circumvents the disadvantages and the problems of the previously mentioned techniques and associated apparatus presently used for generating animated programs on video tape. To this end, an animation edit technique and apparatus is provided which is particularly adaptable to present sophisticated videotape recorders to provide high speed automated recording of animated programs on video tape. The invention provides for the rapid recording of large successions of still images in the "cel", configuration of previous discussion, wherein a "cel" is a video recording unit of a selectable number of video frames or fields of the same piece of material. That is, the same still image recorded a selectable number of times is hereinafter defined as a "cel". The present apparatus provides an animated program in true SMPTE and EBU type-C format, and is capable of recording in both the assemble and insert edit modes, unlike the special animation videotape recorder described above. The recording is made at normal recording speed and thus may be implemented as an integral part of, or an adjunct control panel for, a conventional videotape recorder having a stationary record head and a moveable tracking playback head. Thus the present animation apparatus does not require tape transport modification or prerecorded video tapes in order to produce an animated recording. The cell size readily is selectable to provide added flexibility in generating different types of animated programs. Recording in terms of cel size or duration further provides the advantage of allowing the automated determination of both the entry and exit points of subsequently recorded cels, prior to performing the actual recording, wherein recording a cel of multiple frames or fields is done without having to recue the transport after recording each frame or field of the cel.

In a manually operated configuration, the system provides relatively high speed animation recording with a simple pushbutton input by an operator at the recorder control panel or at a remote location. In an automated embodiment, the entry and exit points of the succession of cels which define program segments may be preselected and programmed into an "edit decision list" or "script", to allow the recorder to automatically record the animated program with a minimum of operator attention. The system readily lends itself to a non-real time hand-drawn art technique, and is particularly adaptable to computer generated graphics systems wherein still images may be dynamically generated and supplied to the recorder in real or non-real time.

To this end, an animate software package and hardware additions provide an animate operating menu with associated animate controls and displays. The hardware includes entry and exit time storage registers, which by way of operator modifiable SMPTE time code or control track tape time information, address the edit entry and exit points, with the resulting numbers in the registers being displayed in respective display areas of the animate menu display on the control panel. A cel size register and respective display of the contents allow an operator to view and modify the cel duration or size in SMPTE time code or control track tape timer information. In addition, a "done" register accumulates and similarly displays a total number of frames or fields in terms of the number of cels which have been recorded. The "done" register is presetable and is updated in accordance with the changes in the entry register content in the course of the recording process, to indicate the accumulated total of cels recorded. A cel count register may be used to count down from an initial total number of cels to be recorded, to indicate thus the end of a preselected program segment or of the entire animated program. This adds flexibility of use in that the edit sequence may be automated, which adds to the convenience of the present animation process.

In operation, the animate operating menu is called up, and key parameters such as an initial edit entry location and cel size are input to the recorder. On command, the first cel is recorded, whereupon the process automatically sets up the next cel recording event by calculating the next edit entry and exit points. The recorder automatically is recued to the calculated next entry point and the process continues. In the manual scheme, the operator presses a pushbutton to generate an animate edit start command which initiates the recording of each cel. In the automated scheme, an animate edit done tally command is sent to the graphics system after a cel is recorded, to increment the latter to the next still image. When the next still image is available, the graphics system sends the animate edit start command and the next cel is recorded. Thus, with simple interfacing to existing animation material generating systems or sources, such as computer graphics devices and animation tables, the animation process and apparatus operates in selectable degrees of automation.

BRIEF DESCRIPTION OF THE DRAWINGS

FIGS. 7 and 8 are flow charts depicting forward and reverse single cel indexing functions provided in the invention combination.

DESCRIPTION OF THE PREFERRED EMBODIMENTS

Figure 1:
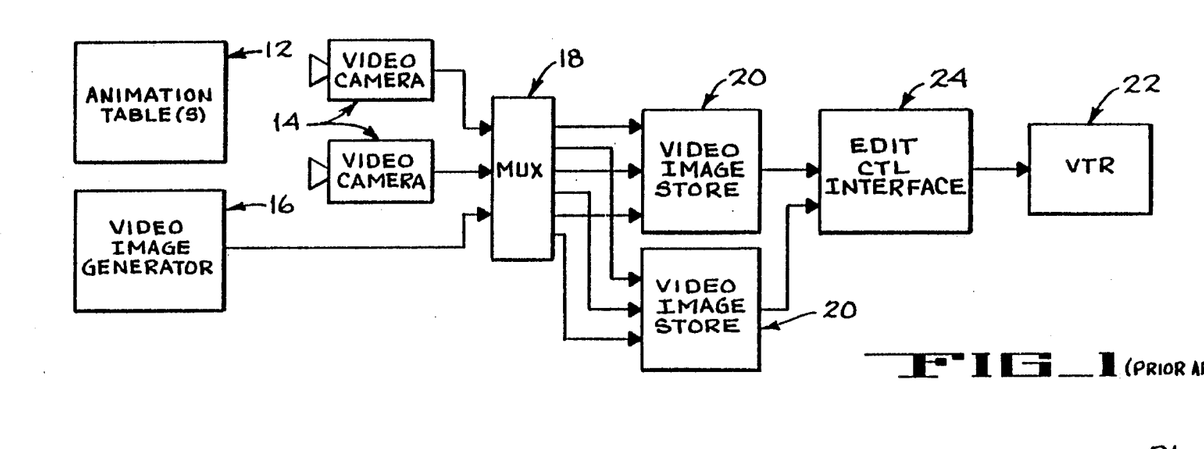
FIG. 1 is a block diagram illustrating a typically improvised system used at present to generate animated programs via videotape recorder apparatus.

FIG. 1 is a block diagram illustrating a typical improvised system presently used to generate animated programs using videotape recorder apparatus. Animation material in the form of hand-drawn art may be supplied via one or more animation tables 12 viewed by a selected number of video cameras 14. Alternately, the material may be supplied as computer generated still video images via a video graphics device, or as video pictures by a video image generating device, herein broadly depicted as a video image generator means 16. The animation material may be supplied as video signals in real, or non-real time, to a multiplexing means 18 which, in turn, supplies selected material to one or more video image stores 20. At such time as the material for animated program segments or for an animated program is available, it is recorded onto video tape in a videotape recorder 22 under control of an edit control interface 24. The edit control interface provides generally conventional edit control signals as directed by an operator, or animator, to determine an initial edit entry point, preroll and lock the transport, color frame, start record, record the image on the video tape at the edit entry point as a field or frame of video, stop record and exit. It may be seen that the system of FIG. 1 is an assemblage of existing devices with the addition of an external means for more conveniently controlling the recording of multiple still video images on video tape via a conventional edit process. Although such a system is an improvement on the film technique for generating animated programs it is cumbersome and time consuming in operation, requires a relatively imposing combination of expensive devices, does not operate in the cel mode of recording, and does not take advantage of the high speed, sophisticated videotape recorders presently available.

Figure 2:
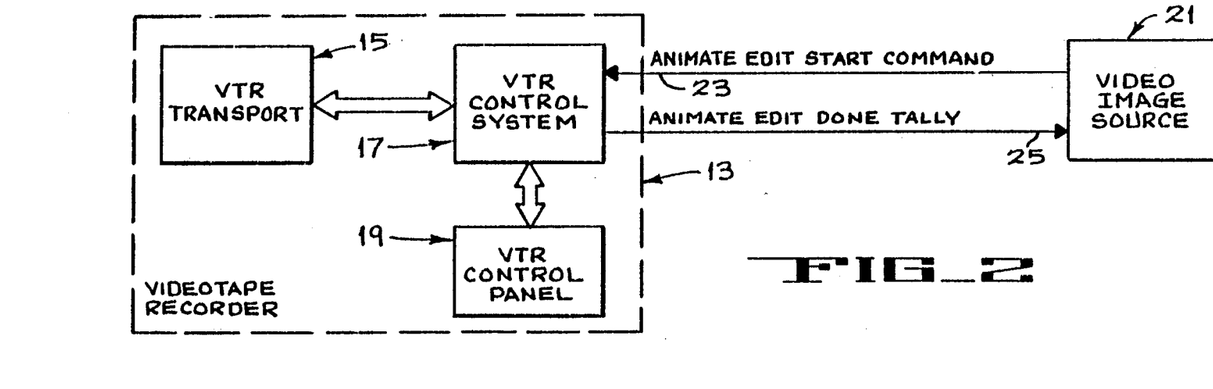
FIG. 2 is a block diagram of a videotape recorder combined with a video image source and depicting the basic combination of the invention.

Referring to FIG. 2, a videotape recorder (VTR) 13 adapted to efficiently record an animated program in accordance with the invention combination, includes a VTR transport 15 under control of a VTR control system 17. A VTR control panel 19 provides operator input to the control system 17. In accordance with the invention, a video image source 21 provides the means for generating and supplying still video images to the recorder 13 as directed by animation associated hardware and software integral with the control system 17 and control panel 19. The primary lines of control include an "animate edit start command" on line 23 which initiates the animation recording process, and an "animate edit done tally" on a line 25 which indicates that a recording process has been performed. The recordings are made using the cel form of recording, wherein the cel duration, i.e., the number of times that a still image is repetitively and continuously recorded, is selectable by an operator. The video image source generally includes an incremental control device, for example, a count-down counter (such as cel count counter 51 of FIG. 3) for counting the number of times the animate edit done tally has been generated, and an associated controller responsive thereto (not shown), whereby the image source is incremented to the next storage location with each tally counted by the count-down counter. The configuration of FIG. 2 is more fully described below with reference to the FIGURES following.

Figure 3:
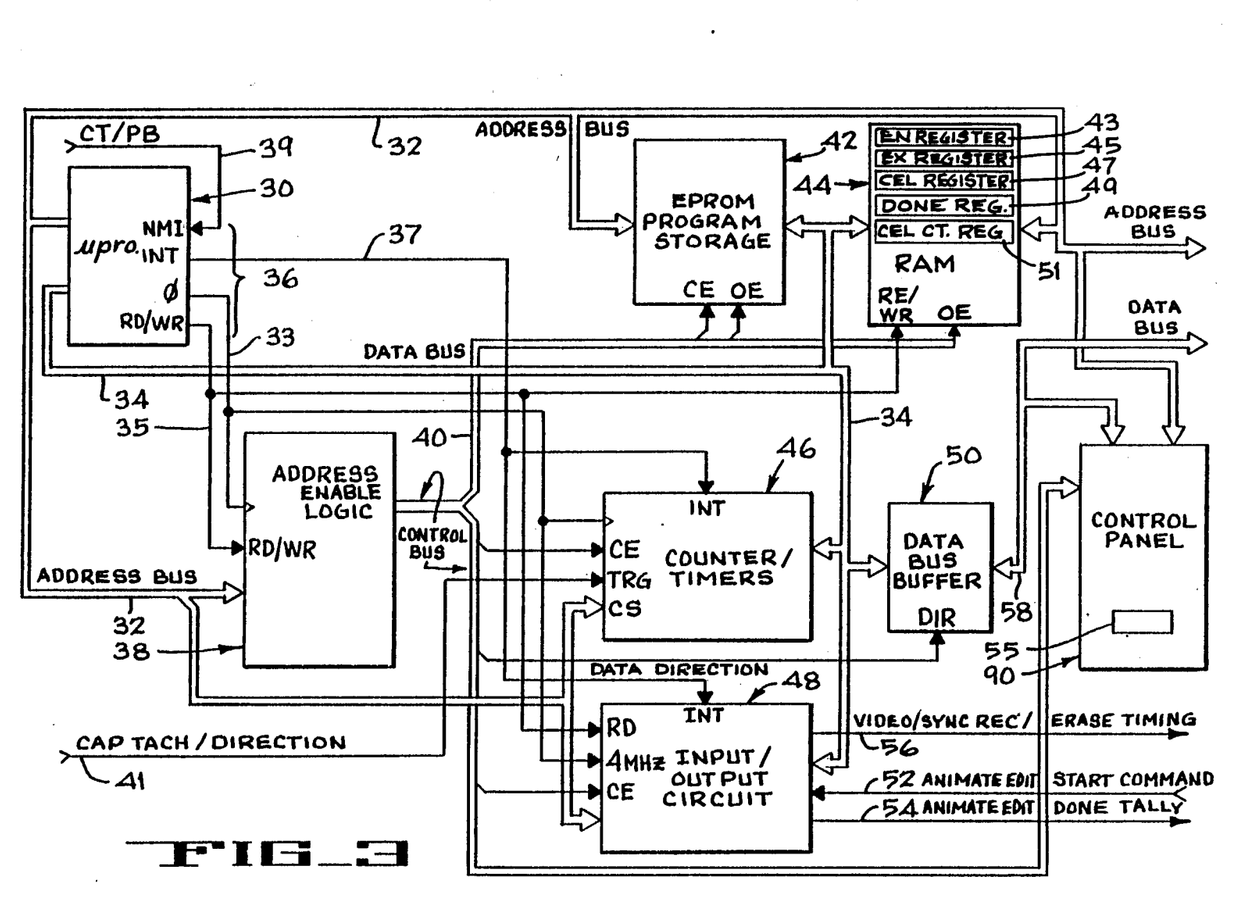
FIG. 3 is a block diagram of the invention combination in the environment of a present high speed videotape recorder.

Referring to FIG. 3, the animation apparatus of the invention is depicted further in the environment of cooperating portions of a videotape recorder. A microprocessor 30 provides, inter alia, an address bus 32, a data bus 34 and a number of control lines indicated generally at 36 and further described below. The address bus 32 and a timing line 33 and read/write line 35 of control lines 36, are coupled to an address enable logic circuit 38, which provides various address enable signals to subsequent components via respective lines herein termed a control bus 40. The data bus 34 is coupled to an EPROM program storage means 42, a RAM means 44, a counter/timer means 46, a control board input/output circuit 48, a data bus buffer 50 and to a control panel 90 similar to the VTR control panel 19 of FIG. 2 via a system data bus 58. The address bus 32 also is coupled to the EPROM program storage means 42, the RAM means 44, the counter/ timer means 46, the control board input/output circuit 48 and the control panel 90. The control lines 36 further include an interrupt line 37 which, along with the timing line 33, is coupled to the counter/timer means 46 and to the control board input/output circuit 48. The interrupt line 37 supplies a tape time and direction interrupt to the counter/timer means 46, and a field interrupt to the input/output circuit 48. The read/write line 35 also provides a read signal to the input/output circuit 48 and read-/write signals to the RAM means 44. A line 39 supplies a control track update signal to the microprocessor 30, which provides update information for tape timer correction, as further described below. The address enable logic circuit 38 supplies the various address enable signals via the control bus 40 coupled to the EPROM program storage means 42, the RAM means 44, the counter/timer means 46, the input/output circuit 48, the data bus buffer 50 and the control panel 90.

The EPROM program storage means 42 store the various program routines for the animation process. For example, the main animate cycle routine and the forward and reverse single cel indexing routines described in FIGS. 6, 7 and 8 below, are stored in the EPROM 42. When the animate operating menu is called up via the control panel 90, the microprocessor 30 addresses the EPROM program storage means 42 to initiate the desired routine. The RAM means 44 provide storage for register and animate edit control and particularly includes the various registers whose contents are displayed in the respective display areas depicted in FIG. 4. More particularly, the RAM means 44 includes an entry register 43, an exit register 45, a cel size register 47, a done register 49 and a cel count register 51. The read/write signal on line 35 enables the read or write modes, while the register being used is selected via the respective lines of the control bus 40, in generally conventional fashion. The various registers and their functions are further described hereinbelow with reference to FIGS. 4-8.

Figure 5:
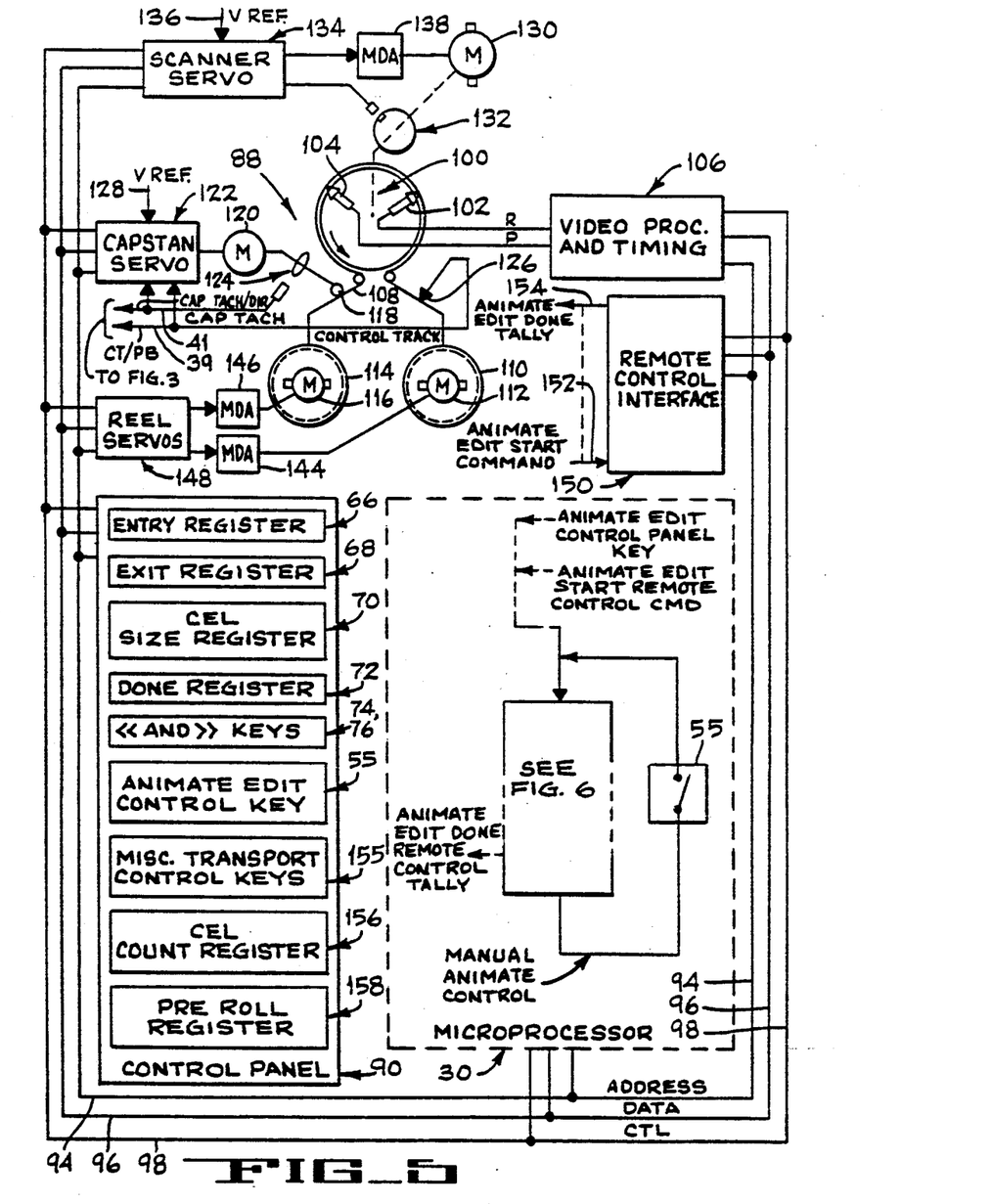
FIG. 5 is a block diagram of the invention combination depicted in FIGS. 2 through 4, further illustrating microprocessor functions corresponding to the animation process software in coordination with selected hardware in a videotape recorder.

The counter/timer means 46 receive a capstan tach signal consisting of a pulse train indicative of the speed of rotation of the capstan and a logic level signal indicative of tape direction, via lines 41 supplied from the tape transport (FIG. 5). The counter/timer means 46 provide tape timing information which controls the movement of tape and the timing of the edit recording process. More particularly, the counter/timer means 46 fabricates the time code numbers from the capstan tach information supplied on line 41 and the control track information supplied on line 39. The microprocessor 30 uses the control track information to update the capstan tach in generally known fashion, to correct the tape timer display. The counter/timer means 46 includes a frequency counter (not shown) which counts the pulse train and derives a count per unit time. The latter is translated into artificial time code or tape timer numbers. In turn, the microprocessor 30 uses the time code number to drive the entire animation process.

The input/output circuit 48 provides external interfacing with various control functions related to the animation record process, and particularly provides parallel input and output lines 52, 54, for receiving the animate edit start command and for outputting an animate edit done tally, respectively. In the manual embodiment the animate edit start command is generated by the operator pressing a pushbutton 55 which is located on the control panel 90, or which may be located remotely on an external remote control interface as depicted in FIG. 5 by numeral 150. In the automated embodiment, the animate edit start command is generated by the image source in response to the control and when the material is ready. The input/output circuit 48 also provides video and sync record and erase timing signals via control lines 56, which turn video record and erase heads of the recorder on and off in the animate process as in a normal edit process. The circuit 48 also interfaces with other parallel remote functions such as stop, play, shuttle, control of lamps, power and audio shield trip, etc., which are common to videotape recorders in general, some of which are enabled via respective keys on the control panel, herein indicated at 155 of FIG. 5. The data bus buffer 50 provides the external data bus 58 to the control panel and other circuit boards (not shown) of the videotape recorder, and also supplies bidirectional data related to servo control and audio record timing which are not per se part of the invention combination. The data bus flow direction is under control of a data direction signal provided by the address enable logic circuit 38 via a line of the control bus 40.

Figure 4:
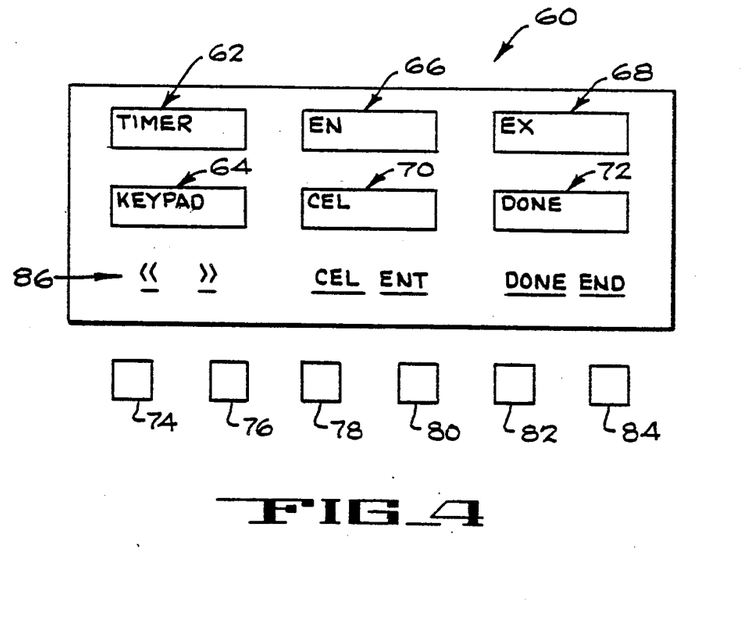
FIG. 4 is a pictorial representation of an animate operating menu as combined with an operator control panel in a videotape recorder apparatus.

FIG. 4 illustrates by way of example an animate operating menu as displayed on a mode enable control portion 60 of an operator control panel on a sophisticated videotape recorder such as the VPR-3 Video Production Recorder manufactured by Ampex Corporation, Redwood City, Calif., and described in the Manuals 1809630 and 1809593, April, 1984, whose disclosures are herein incorporated by reference. The control portion 60 includes multifunction soft keys with an alphanumeric display of operator selectable menus, wherein one of the menus is the animate operating menu of the invention combination, and is depicted in FIG. 4. The display includes six display areas; viz., a tape timer display area 62, a keypad entry area 64, an entry (en) register display area 66 and an exit (ex) register display area 68, which display areas are generally similar in layout to menus used in various conventional edit modes. The menu further includes a cel size (cel) display area 70 and a done (done) register display area 72 which, in both display and function, are unique to the present animate operating menu. The six soft keys 74, 76, 78, 80, 82 and 84 are depicted below the display and, when the animate operating menu is called up, are assigned the functions shown alphanumerically immediately above each key along a label line 86. Thus keys 74 and 76 provide access for indexing the tape a distance of one cel in reverse or forward directions respectively (i.e., decrement or increment to the respective cel's edit entry point) and thus for recueing the tape transport. Key 78 provides selection of a desired cel size, while keys 80 and 82 provide access for selection of the edit entry and exit points. The key 84 provides means for accessing the done register when the operator wishes to preload the register as when part of a program was previously recorded and the operator wants to continue recording from the previous cel accumulation. The functions and relationships of the soft keys and the displays are further described below with respect to the associated circuitry and flow charts of the FIGS. 5-8.

FIG. 5 includes by way of description, a block diagram of a videotape recorder tape transport 88 with associated servo and video processing circuits. There also is included in a pictorial representation, the control panel 90 and the microprocessor 30 (of FIG. 3) in the form of a dashed block, wherein the animation process operating sequence in accordance with the invention is illustrated as a smaller block therein labeled "see FIG. 6", and comprises the main animate routine in the form of a flow chart. The combined hardware, control signals and animation process operating sequence communicate via an address bus 94, a data bus 96, and a control bus 98, which correspond to the address bus 32, data bus 34 and control lines 36 respectively, of FIG. 3.

More particularly, the tape transport 88 includes a scanner drum 100 with record head 102 and playback head 104 coupled to a generally conventional video processing and timing circuit 106. A video tape 108 is supplied in a forward direction by a supply reel 110 and motor 112, is threaded about the scanner drum 100 in a helical wrap and in contact with the heads, and thence fed to a takeup reel 114, and motor 116. A capstan 118 engages the tape in response to a capstan motor 120 driven by a capstan servo 122 coupled to the motor. A capstan tach 124 supplies a signal on the line 41 of previous mention, indicative of capstan speed. A control track head 126 provides a control track signal in the form of off-tape timing information indicative of tape movement, to the capstan servo 122, and also supplies the control track signal to the microprocessor 30 of FIG. 3 via the line 39 of previous mention, to provide capstan signal update, as previously discussed. The capstan servo 122 also receives the usual system vertical reference signal (VREF) via a line 128.

The scanner drum 100 is driven by a scanner motor 130, and the drum speed is monitored by means of a scanner tach 132 coupled to a scanner servo 134. The servo 134 receives the usual system vertical reference (VREF) on a line 136 and supplies a drive signal to the motor 130 via a motor drive amplifier 138. The supply and takeup reel motors 112, 116 are driven by motor drive amplifiers 144, 146 under control of a reels servo 148, which locks the supply and takeup reels to the capstan servo 122 to minimize tape distortion. The functions and operation of the various servos are generally known in the art, as shown in the VPR-3 manuals of previous mention, and thus are not further described herein.

In keeping with the various embodiments of the invention, a remote control interface 150 is depicted with connections to the address, data and control buses 94, 96 and 98, and provides external control input by an animator located, for example, at an animation table or a graphics system where the animation material is being generated. A remote animate edit start command is fed to the interface 150 on a line 152, and corresponds to the edit start command introduced on the line 52 of FIG. 3. An animate edit done tally is supplied at the remote control interface 150 on a line 154, and corresponds to the animate edit done tally provided on the line 54 of FIG. 3.

The video processing and timing circuit 106, the capstan servo 122, the scanner servo 134 and the reel servos 148, all are coupled to the address, data and control busses 94, 96, 98, and variously measure and supply signals from the tape transport 88 to provide controlled movement of the video tape 108 in the various transport operating modes of shuttle, record, replay and variable play, in generally conventional fashion. It may be seen that the data, address and control buses 94, 96, 98 correspond to the busses 34, 32 and 40 respectively of FIG. 3. Thus the servos receive digital control words via the respective busses, under commands supplied by the operator via the videotape recorder control panel 90 and associated microprocessor 30, which also are coupled to the data address and control buses 94, 96, 98 as depicted in FIG. 3. In the present invention description of interest here, the control panel is depicted by the block 90 coupled to the address, data and control busses 94, 96 and 98 and includes those parts of the apparatus of FIGS. 3, 4 which are pertinent to the present animation process. The various rectangles shown in the control panel 90 represent the various register and memory displays and keys shown in FIGS. 3 and 4, and illustrate the communication thereof with the transport servos, the video signals, the remote control interface 150, and the microprocessor 30, via the various busses 94-98.

The operator calls up the animate operating menu of FIG. 4, and enters the cel size and initial edit entry point into the cel size and entry registers 47 and 43 respectively, in the RAM 44 (FIG. 3) via the keys 78 and 80, as time code numbers which are displayed in respective cel size and entry displays 70, 66 of FIG. 5. He then initiates the animate edit start command via the animate edit control key 55 depicted in the control panel 90 (and also as a switch 55 in the manual animate control loop illustrated in the microprocessor 30). The command prerolls the video tape 108 to the desired cue point to position the tape upstream for recording the initial cel at the first edit entry point while the tape is moving at normal record speed. When editing, the step of advancing the tape to within a preselected distance from an edit entry point is known as cueing. Typically the distance may be seven frames, which allows for the tape transport to be accelerated to record velocity, be locked to sync and color framed before recording the cel. As discussed before, the cel is formed of a single still video image which is recorded the selected number of frames or fields previously entered in the cel size register 47. To provide the information required to properly cue and park the video tape, the operator selects an initial reference point on the tape, for example, zero time, and enters the corresponding number in the entry register 43. The control system and microprocessor 30 then updates the time code numbers in the various registers as the tape is moved to indicate the initial edit entry point, and thereafter to generate numbers corresponding to the position of subsequent edit entry and exit points relative to the reference point. The displayed time code numbers are SMPTE code numbers which identify frames or pairs of fields depending upon the mode selected to record the video signal. In a type-C format, the identification of a pair of fields identifies each particular track on the tape. Thus each cel of the animated program may be recorded as frames or fields on the video tape. The time codes are displayed on the entry, the exit, the cel size and the done register displays 66, 68, 70 and 72 respectively of the control panel 90, whereby the cel size and the initial edit entry point are entered by the operator prior to recording the first cel. Since the exit edit point is determined by the cel size, and also corresponds to the edit entry point of the next cel, subsequent edit entry and exit points readily are calculated by adding the cel size to the edit entry point after each cel recording to determine both the entry and the exit points of the subsequent cel. Thus, unlike a conventional edit scheme, the edit exit points are calculated for not only the subsequent recording period (in this instance, a cel) but further, may be calculated for all edit entry and exit points of all subsequent recording periods, or cels. Thus, after each recording and calculation, the tape is immediately and automatically recued in preparation for recording the next cel, since the next edit entry point is already known. With such a pre-calculation feature the system readily is automated for real or non-real time operation.

The control panel 90 of FIG. 5 represents the display areas and keys shown in FIG. 4, wherein the contents of the respective registers 43, 45, 47, 49 and 51 are displayed in terms of the time code numbers. When performing the calculation, the content of the cel size register 47 is selectively added to the entry and exit registers 43, 45 as directed by the microprocessor 30 to provide the next cel entry and exit points as previously mentioned. The microprocessor 30 makes a comparison of the control track information with the exit register contents immediately after a cel recording to determine that the calculation of the next entry and exit points should be made, i.e., that the cel size register 47 contents should be added to the entry, exit (and done) register contents 43, 45 (and 49) respectively. The use of the cel as a recording unit also introduces the feature of allowing an operator to index the tape in the forward or reverse direction a distance of one or more cels, by pressing the forward or reverse keys 76, 74 respectively on the control panel 90. Thus, when the review of a prior cel is desired, the content of the cel size register 47 is subtracted from the entry register 43 to index back to the entry point of the cel previously recorded when the decrement key 74 is pressed once. If the operator wishes to reverse index a number of cels, the tape is indexed back through the number of entry points, corresponding to the number of cels, i.e., back through the successions of frames or fields of each cel, by pressing the decrement key 74 the number of times. Forward indexing is similarly provided by adding the cel size register contents to the entry register 43 in response to the increment key 76.

Figure 6:
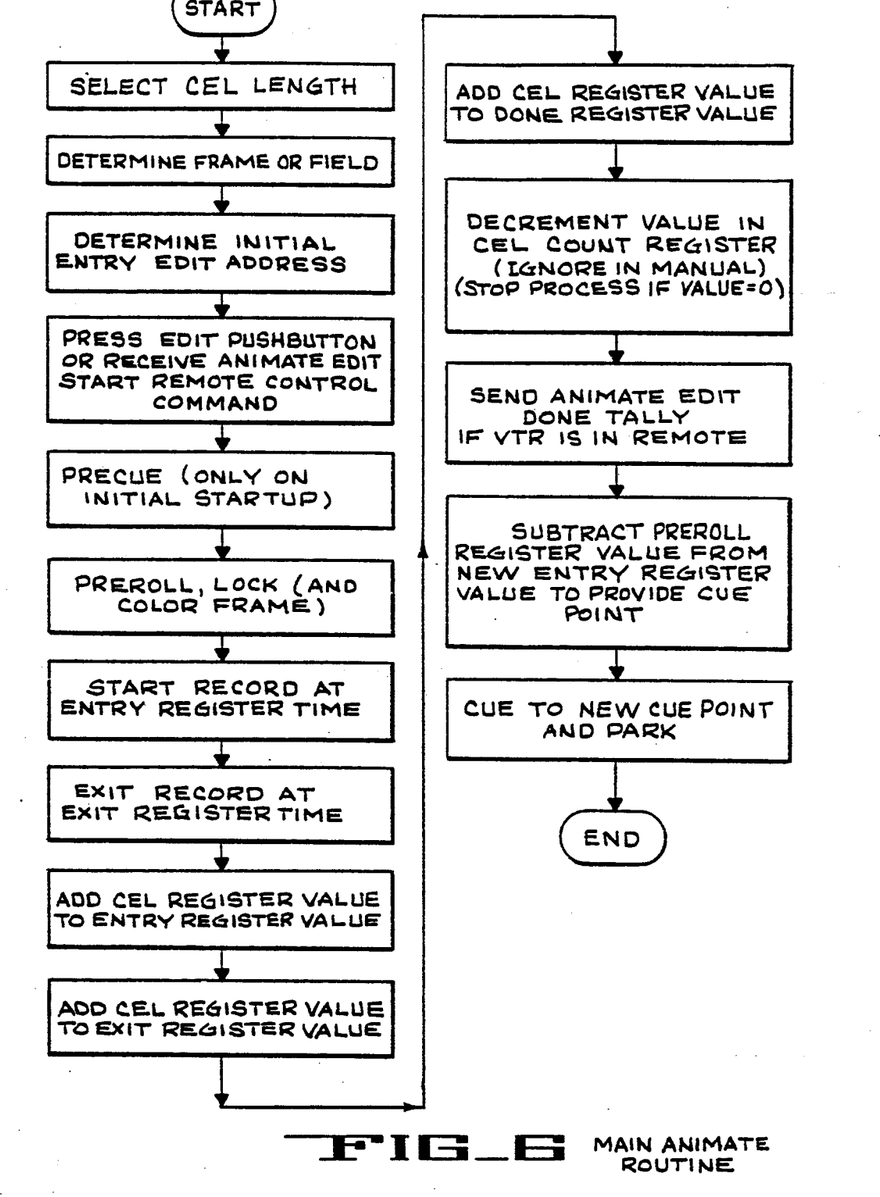
FIG. 6 is a flow chart depicting the main animate operating cycle of the invention combination.

Referring to FIG. 6 as well as to FIG. 5, there is depicted the main animate routine for performing the animation process of the invention combination and which is depicted by the rectangle in microprocessor 30. At the beginning of recording an animated program using the manual or automated schemes, the videotape recorder is turned on, the cel length is selected by entering the corresponding data in the cel size register 47 in the RAM means 44 via the key pad in the control panel 90. Likewise, the initial edit entry point is selected and entered in the entry register 43 in the RAM means. The pushbutton 55, labeled animate edit control key, and supplying the animate edit start command, is pressed which first precues the transport 88 to the initial cue point corresponding to the initial edit entry point entered in the entry register. Then the transport prerolls the tape, locks to the V reference and color frames prior to the edit entry point. At normal record speed, the recorder begins recording the cel at the edit entry point and stops recording at the edit exit point as selected on the entry and exit registers 43, 45. The length of the cel is determined in this embodiment by the entry in the cel size register. If the videotape recorder and the animate routine are adapted the cel size may be provided by selecting the contents of the entry and exit registers. As soon as the record functions are completed, the microprocessor 30 compares the control track information with the exit register number to provide the match which adds the contents of the exit register 45 to the entry register 43 to create a new entry number, adds the cel size register 47 to the exit register 45 to create a new exit number, and adds the cel size register to the done register 49 to provide an updated accumulated total recording time.

In the automated scheme, the cel count register 51 in the RAM means 44, contains the total number of cels to be recorded for a program depicted by a display 156 in the control panel 90. After recording a cel the cel count register 51 is decremented by one cel. If the cel count equals zero the program is complete and the process is stopped. After each recording, the animate edit done tally is generated to enable a light or other similar device to indicate to the operator that the cel is recorded, or to command the image source to provide the next still image. The content of a preroll register depicted by a display 158, is subtracted from the new entry register number to produce a new cue point for the next edit entry point. The recorder then is parked at the new cue point, i.e., is recued automatically from the calculations performed by the microprocessor 30, in preparation for the next animate edit start command from the operator.

As previously mentioned, in the manual process an operator presses the pushbutton or key 55 to generate the animate edit start command for each cel recording process, at such time as the corresponding art material is available for recording. In the automated process, the cel count register 51 continually counts down from the initial number of cels, in response to the animate edit done tally. As long as the contents are not equal to zero, the next animate edit start command is sent automatically, but only when the external video image generator is ready to send the next cel image to the videotape recorder. At such time as the cel count register decrements to zero meaning that the entire program is recorded, an edit done tally is not sent, thus an animate edit start command is not sent, and the process is stopped.

In both the manual and automated embodiments, the steps of calculating the succeeding cels by shifting the contents of the cel size, entry and exit registers 47, 43 and 45, and of recueing the transport to the new calculated cue point in preparation for the preroll, lock, color frame and record at edit entry point, are done automatically since the cel size is known. An edit decision list or script of all edit entry and exit points may be calculated prior to recording the program, and stored in a memory integral with the video image source 21 (FIG. 2). As each edit is performed, the successive edit numbers are deleted from memory until the program is completed. In the event that a piece of animation material is not ready, an animate edit start command is not sent by the video image generator, and the recording process temporarily ceases. However, the transport still is automatically recued to the next cue point in preparation for the next cel edit when the material is ready and the start edit command is sent.

The flow chart of FIGS. 7 and 8 depict forward and reverse indexing routines for moving the tape forward or back a distance of one cel; i.e., a distance of the number of frames or fields selected for one cel whereby the tape is moved forward or back to the previous or succeeding edit entry point. The charts are generally self-explanatory, wherein it may be seen that the forward indexing process of FIG. 7 is similar to the calculation performed to determine the next edit entry point. The reverse indexing process involves subtracting the cel size from the entry, the exit and the done registers 43, 45 and 49, to provide the edit entry point of the previous cel recording and automatic recueing of the tape.

What is claimed is:

1. System for recording an animated program as a succession of cels formed of a plurality of still images, comprising:

means for supplying the plurality of still images;

means for selecting the cel size in terms of the number of times a single still image is repeated for each cel;

means for selecting a first edit entry point for a first selected cel;

means for continuously recording the entire first selected cell in response to the supplying means;

means for calculating the edit entry point of a succeeding cel by selectively adding the cel size to the first edit entry point;

means responsive to the calculating means for immediately recueing the recording means upon recording the first selected cel; and wherein the recording means continuously records the succeeding cel at its respective edit entry point in response to the supplying means providing a corresponding still image.

2. The system of claim 1 wherein the cel size is selected as numbers of fields or frames of recorded video corresponding to the plurality of still images.

3. The system of claim 1 wherein:

the calculating means also determines an edit exit point for the selected cel prior to performing the recording; and the edit exit point for the selected cel is the edit entry point for the succeeding cel.

4. The system of claim 3 including:

entry register means for storing a value corresponding to the edit entry point;

exit register means for storing a value corresponding to the edit exit point; and cel size register means for storing a value corresponding to the number of repetitions of a single still image in a cel.

5. The system of claim 4 wherein the calculating means further include:

means for adding the value of the cel size register means to the entry and exit register means in response to the recording means to provide the edit entry and exit points of the succeeding cel.

6. The system of claim 1 wherein:

the supplying means further supplies an edit start command when each of the plurality of still images is available; and the recording means further includes means for providing an edit done command upon completion of the recording of each entire cel.

7. The system of claim 6 including:

done register means for storing a done value indicative of the successive number of accumulated cel recordings; and means for adding the value of the cel size register means to the done register means to generate the edit done command.

8. The system of claim 7 wherein the recueing means include:

preroll register means for storing a value corresponding to the distance of a cue point from its respective edit entry point, said value being subtracted from the entry register means value in response to the edit done command to provide the que value for the succeeding cel.

9. The system of claim 1 including:

means for stepping the recording medium a distance corresponding to at least one cel duration in a selected reverse or forward direction to a respective previous or succeeding edit entry point; and said recueing means immediately recues the recording medium to a cue point associated with the edit entry point.

10. The system of claim 1 including:

cel count register means for storing a value indicative of the total number of cels in the program; and means for decrementing the cel count register means upon recording each cel to determine the end of the program.

11. System for recording an animated program on a video tape as a succession of cels formed of a plurality of still video images comprising:

a source of the plurality of still video images;

a cel size register for storing a cel duration representative of a selectable number of video frames or fields of a single still video image;

an entry register for storing successive values of corresponding successive edit entry points of respective cels;

an exit register for storing successive values of corresponding successive edit exit values of respective cels;

means for providing an animate edit start command when each still video image is available;

means for recording a selected cel at a respective edit entry point as repeated video frames or fields, in response to the animate edit start command;

calculating means responsive to the recording means for adding the contents of the cel size register to the contents of the entry and exit registers to provide new edit entry and exit points for a subsequent cel;

means responsive to the calculating means for generating an animate edit done tally; and means for immediately recueing the video tape in response to the animate edit done tally in preparation for recording the subsequent cel at the respective new edit entry point.

12. Method for recording, on a selected recording medium, an animated program as a succession of cels formed of a plurality of video images, comprising:

supplying the plurality of video images;

selecting the cel duration in terms of the number of times a single video image is to be continuously and repetitively recorded;

selecting a first edit entry point;

recording a first selected cel at the selected first edit entry point;

calculating the edit entry and exit points for each succeeding cel prior to recording by selectively combining in successive accumulation the cel duration with the successive edit entry and exit points;

recueing the recording medium to a respective cue point corresponding to each successive edit entry point immediately upon completion of recording the previous selected cel; and recording each succeeding cel at its corresponding pre-calculated edit entry point in response to the step of supplying each of the plurality of video images.

13. The method of claim 12 including:

stepping the recording medium a distance corresponding to at least one cel duration in a selected reverse or forward direction to a respective previous or succeeding edit entry point to provide review of a selected recorded cel; and immediately recueing the recording medium to a cue point associated with the corresponding edit entry point.

14. The method of claim 12 including:

generating an animate edit done tally when the step of recording an entire cel is completed; and immediately moving the recording medium to the cue point associated with each successive edit entry point in response to the generation of the respective animate edit done tally.

15. The method of claim 12 wherein the step of selecting includes:

storing a value corresponding to the number of fields or frames that a video image is recorded to define the cel duration.

16. The method of claim 15 including:

generating an animated edit done tally and a corresponding done register value when a step of recording is completed;

storing values equal to the successive edit entry and exit points for each cel in corresponding entry and exit registers respectively; and storing in a done register an accumulation of successive done register values corresponding to the number of recordings.

17. The method of claim 16 wherein the step of calculating includes:

adding the value of a cel to each edit entry and exit register values to provide the successive new edit entry and exit points; and adding the value of a cel to each done register value to provide successive done register values corresponding to the total number of recordings in the program.

18. The method of claim 17 including:

displaying the successive values of the entry, the exit and the done registers.

* * * * *